United States Patent [19]

Luchtenberg

[11] 4,245,894
[45] Jan. 20, 1981

[54] ANGLE-REFLECTING MIRROR

[75] Inventor: Curt Luchtenberg, Solingen-Wald, Fed. Rep. of Germany

[73] Assignee: Hagus C. Luchtenberg GmbH & Co. KG, Solingen-Wald, Fed. Rep. of Germany

[21] Appl. No.: 37,468

[22] Filed: May 9, 1979

[30] Foreign Application Priority Data

May 19, 1978 [DE] Fed. Rep. of Germany ... 7815094[U]

[51] Int. Cl.³ .............................................. G02B 5/08
[52] U.S. Cl. ................................................. 350/303
[58] Field of Search ................ 350/303, 304, 288, 293

[56] References Cited

U.S. PATENT DOCUMENTS

| 1,869,456 | 8/1932 | Bausch | 350/303 |
|---|---|---|---|
| 2,514,989 | 7/1950 | Buren | 350/303 |
| 3,764,201 | 10/1973 | Haile | 350/303 |
| 4,023,029 | 5/1977 | Fischer | 350/293 |

FOREIGN PATENT DOCUMENTS

| 675182 | 5/1966 | Belgium | 350/303 |
|---|---|---|---|
| 1923372 | 11/1970 | Fed. Rep. of Germany | 350/303 |
| 2207208 | 8/1973 | Fed. Rep. of Germany | 350/303 |
| 2507708 | 9/1976 | Fed. Rep. of Germany | 350/303 |

Primary Examiner—Jon W. Henry
Attorney, Agent, or Firm—Spensley, Horn, Jubas & Lubitz

[57] ABSTRACT

This mirror contains two mirror sections that are angled with respect to each other and are contiguous to each other along a kink line. The mirror may be surrounded by a frame, however the kink line is uncovered and visually unobstructed by the frame. The mirror sections may be formed from a unitary piece of glass bent along the kink line, or may be formed of separate sections bonded together. The kink line advantageously is non-reflective and may be made more clearly evident by providing a thin colored line along the kink line. Additionally, each mirror section may be made of a uniquely differently colored material.

4 Claims, 4 Drawing Figures

ANGLE-REFLECTING MIRROR

BACKGROUND OF THE INVENTION

1. Field of the Invention

The invention relates to a mirror having two sections contacting each other and inclined with respect to each other, forming an angle.

2. Background of the Invention

A mirror having a nonplanar surface is often attached to the exterior of a vehicle. In order to obtain a reflected view of wide angle, such mirrors have been made with more than one mirrored section. Usually, such a multiply sectioned mirror assembly consists of a planar or slightly curved mirrored section adjacent a second, possibly convex, mirrored section. The two mirror sections are separated by a portion of the mirror frame. The frame completely borders each mirror section and also forms a division between the two sections.

Certain other rearview mirrors have been formed from a unitary piece of glass, with two sections smoothly curved into each other, avoiding the formation of a sharp line of separation between them. Such mirrors cause considerable visual distortion due to the contour of the mirror between the two mirrored sections. A driver using such a mirror cannot easily recognize where an object is actually located when it is viewed in such a rearview mirror due to the curvature of the mirrored surfaces.

It is an object of the herein disclosed invention to provide for an angled rearview mirror not having the frame cover the portion of the mirror sections in contact with each other, yet allowing a user to visually distinguish the separate images reflected by the individual mirror sections.

SUMMARY OF THE INVENTION

These and other objects are provided for in the herein disclosed invention by a mirror having two angled mirror sections contacting each other in a "kink line" which is unobstructed by the frame. The herein disclosed invention comprises a multiply sectioned mirror in which the face of the mirror glass is uninterrupted, yet a kink line between the angled mirror sections is clearly visible, indicating to the user which mirror section is reflecting the viewed image. This allows a driver, for example, using such a mirror to immediately determine from the reflected image which mirror section is reflecting the image of another vehicle, aiding the driver in properly orienting and positioning the reflected vehicle with respect to himself.

In one embodiment of the invention, individually manufactured mirror sections are bonded together. Although a kink line is formed, the face of the bonded mirror sections as a whole is uninterrupted. The bonded mirror sections are a sufficiently rigid assembly to not require the individual mirror sections to be individually framed.

In another embodiment of the invention a single mirror is kinked or sharply bent along a line to form on both sides of the line appropriately curved mirror sections. In such an embodiment, to clearly indicate the line of separation between the mirror sections, the reflective coating of the mirror may be removed from the area behind the line of separation. The line of separation is then clearly visible, readily separating the images reflected from the individual mirror sections.

In another embodiment, the mirror sections are manufactured of differently colored glass. For instance, the main mirror segment may use a bluish glass, and the other mirror segment may use a silvery glass.

DETAILED DESCRIPTION OF PREFERRED EMBODIMENTS

Figure 1:
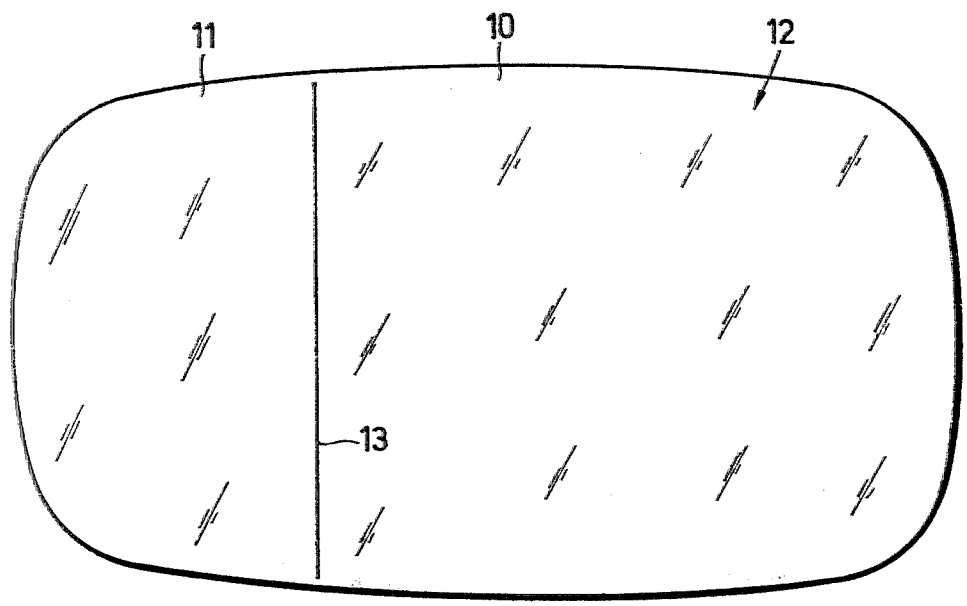
FIG. 1 is a front view of a mirror assembly used in one embodiment of the herein disclosed invention.
Figure 2:
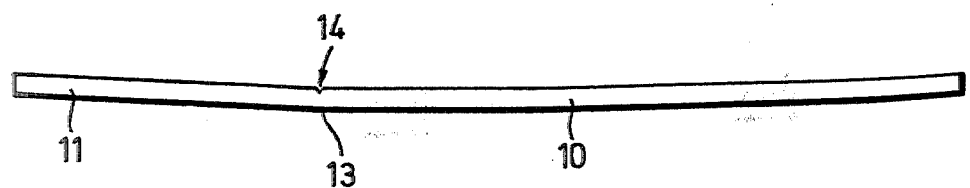
FIG. 2 is a top view of the embodiment illustrated in FIG. 1.

In the preferred embodiment of the invention illustrated in FIGS. 1 and 2, there is provided a unitary pane of glass 12 having two separate mirrored sections 10, 11. Recent advances in manufacturing techniques allow production of mirrors in which a unitary mirror glass may be sharply kinked and individual sections of the glasss on either side of the kinking line may be curved as desired. Although not critical to the invention, certain embodiments of the invention have been constructed with the glass pane thickness approximating 3 millimeters. The mirror section 10 is the primary mirror section and may be formed concavely to present a magnified reflected image. In other embodiments of the invention, the main mirror face 10 may be planar.

The smaller mirror section 11, typically the section furthest away from a vehicle to which the mirror assembly may be attached, may be convex, so as to reflect an image encompassing a wider angle than that which would be obtained by a planar mirror. The two mirror sections 10,11 come together at a well defined kink line 13. Although FIG. 2 shows only a thin kink line 13 between the mirror faces 10, 11, because of the angle between the two mirror faces 10, 11 and the resulting reflections from the kink line 13, the line 13 is clearly visible to a user of the mirror.

If it is desired to more clearly distinguish the kink line 13 between the two mirror segments 10, 11 the reflective coating of the mirror behind the line of separation 13 may be removed. Additionally, a thin colored line 14 may be formed on the surface of the assembly behind the kink line of 13 to fill in or replace the portion of the reflective coating removed. Such a line 14 is preferably between 0.5 millimeters and 1 millimeter in width.

Figure 3:
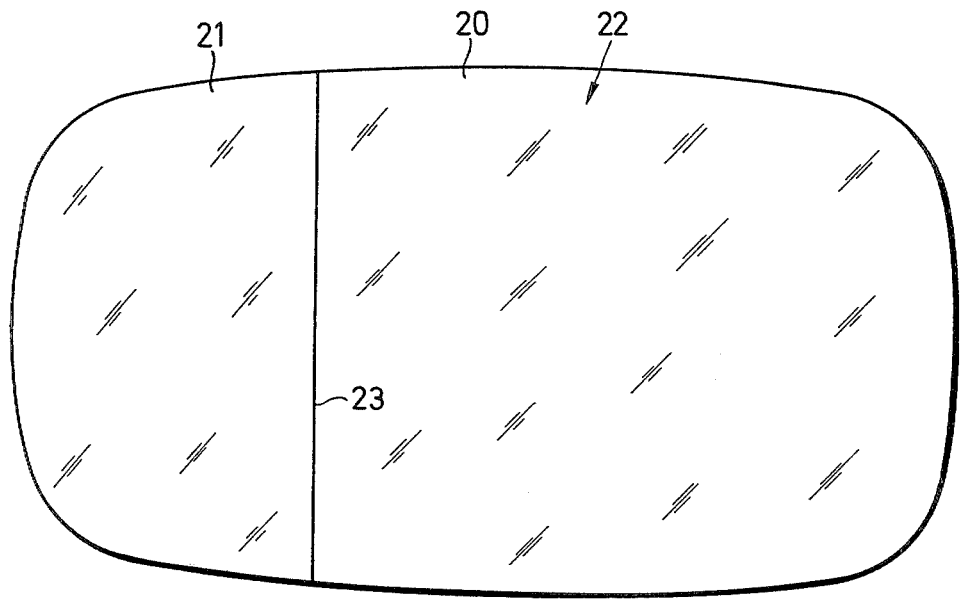
FIG. 3 is a front view of a mirror assembly of another embodiment of the invention.
Figure 4:
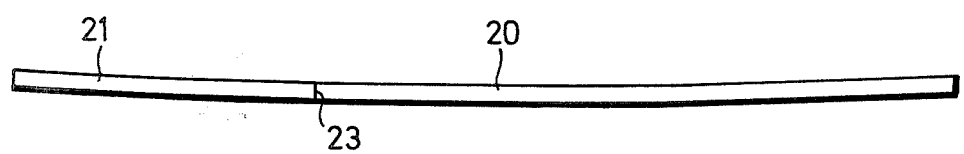
FIG. 4 is a top view of the embodiment illustrated in FIG. 3.

In another embodiment of the invention, illustrated in FIGS. 3 and 4, two individual mirror sections 20, 21 come together to form an angle along a kink line 23, forming the total mirror 22. In one embodiment the two mirror sections 20, 21 may be formed with a radius of curvature of 2,000 millimeters each. The two mirror sections 20, 21 each have a straight edge along which they contact each other to form a kink line 23 and are bonded together. The kink line 23 is clearly visible to the user and forms a suitable border line for the images reflected from each mirror section 20, 21.

Although not illustrated in the figures, a mirror formed by the teachings of the herein disclosed invention may be suitably retained by a frame surrounding the outer edges of the mirror sections. It is unnecessary and undesirable to support the individual mirror sections along the kink line. Such a support would obstruct the reflected images and add unnecessary structure to the assembly.

While only a limited number of embodiments of the disclosed invention have been discussed herein, it will be readily apparent to persons skilled in the art that certain changes and modifications may be made without departing from the true spirit of the invention. Accordingly, the foregoing disclosure, description, and figures are for illustative purposes only, and do not in any way limit the invention, which is defined only by the appended claims.

I claim:

1. A mirror comprising:
   a single unitary mirror with a reflective coating on its rear surface, the mirror being partitioned into two mirror sections which are angled with respect to one another along a kink line formed where the mirror bends between the sections;
   the face of the mirror being uncovered at the kink line; and
   wherein the reflective coating behind the kink line has been removed.

2. A mirror comprising:
   a single unitary mirror with a reflective coating on its rear surface, the mirror being partitioned into two mirror sections which are angled with respect to one another along a kink line formed where the mirror bends between the sections;
   the face of the mirror being uncovered at the kink line; and
   wherein behind said kink line is formed a colored non-reflecting line visible from the front and separating the images reflected by the mirror sections.

3. A mirror comprising:
   a transparent pane, sharply bent along a kink line to form first and second sections, the front of said pane being uncovered along said kink line; and
   a reflective coating affixed to the rear side of said pane except behind said kink line, said pane thereby being nonreflective along said kink line so that images reflected by said respective first and second sections are visually separated by said kink line.

4. A mirror comprising:
   a transparent pane, sharply bent along a kink line to form first and second sections, the front of said pane being uncovered along said kink line;
   a reflective coating on the rear side of said pane except behind said kink line; and
   a colored opaque coating on the rear side of said pane directly behind said kink line, so that images reflected by said respective first and second sections are visually separated by said colored kink line.

* * * * *